US007653877B2

(12) United States Patent
Matsuda

(10) Patent No.: US 7,653,877 B2
(45) Date of Patent: Jan. 26, 2010

(54) INFORMATION PROCESSING APPARATUS AND METHOD, AND STORAGE MEDIUM

(75) Inventor: Kouichi Matsuda, Tokyo (JP)

(73) Assignee: Sony Corporation, Tokyo (JP)

( * ) Notice: Subject to any disclaimer, the term of this patent is extended or adjusted under 35 U.S.C. 154(b) by 1061 days.

(21) Appl. No.: 10/914,465

(22) Filed: Aug. 10, 2004

(65) Prior Publication Data

US 2005/0015725 A1 Jan. 20, 2005

Related U.S. Application Data

(62) Division of application No. 09/841,041, filed on Apr. 25, 2001, now Pat. No. 6,981,220.

(30) Foreign Application Priority Data

Apr. 28, 2000 (JP) ............................. 2000-129758

(51) Int. Cl.
*G06F 3/048* (2006.01)
(52) U.S. Cl. ....................................... 715/706; 463/32
(58) Field of Classification Search ................. 715/706; 463/1, 32
See application file for complete search history.

(56) References Cited

U.S. PATENT DOCUMENTS

| | | | | |
|---|---|---|---|---|
| 4,542,903 A | * | 9/1985 | Yokoi et al. | 463/31 |
| 5,707,288 A | * | 1/1998 | Stephens | 463/33 |
| 5,734,720 A | * | 3/1998 | Salganicoff | 380/211 |
| 5,736,982 A | * | 4/1998 | Suzuki et al. | 715/706 |
| 5,884,029 A | * | 3/1999 | Brush et al. | 709/202 |
| 5,948,061 A | * | 9/1999 | Merriman et al. | 709/219 |
| 5,982,372 A | * | 11/1999 | Brush et al. | 345/418 |
| 6,034,684 A | * | 3/2000 | Proehl et al. | 715/764 |
| 6,117,061 A | * | 9/2000 | Popat et al. | 493/325 |
| 6,141,019 A | * | 10/2000 | Roseborough et al. | 345/473 |
| 6,159,100 A | * | 12/2000 | Smith | 463/42 |
| 6,219,045 B1 | * | 4/2001 | Leahy et al. | 715/757 |
| 6,286,045 B1 | * | 9/2001 | Griffiths et al. | 709/224 |
| 6,292,198 B1 | | 9/2001 | Matsuda et al. | |
| 6,322,451 B1 | * | 11/2001 | Miura | 463/42 |
| 6,366,285 B1 | * | 4/2002 | Brush et al. | 345/473 |
| 6,371,856 B1 | * | 4/2002 | Niwa | 463/43 |
| 6,392,667 B1 | * | 5/2002 | McKinnon et al. | 715/738 |
| 6,496,207 B1 | | 12/2002 | Matsuda et al. | |

(Continued)

OTHER PUBLICATIONS

Ms. Pac-Man, The Video Game by Midway MFG. Co. 1981, pp. 1-2.*

(Continued)

*Primary Examiner*—Boris Pesin
*Assistant Examiner*—Shen Shiau
(74) *Attorney, Agent, or Firm*—Oblon, Spivak, McClelland, Maier & Neustadt, L.L.P.

(57) ABSTRACT

Disclosed is an information processing apparatus for controlling an application object moving autonomously in shared virtual space in which avatars representing users of other information processing apparatuses are active. The apparatus comprises a distribution examining element for examining distribution of the active avatars in the shared virtual space, a coordinate controlling element for controlling coordinates of the application object in accordance with results of the examination by the distribution examining element and a display controlling element for controlling display of information by the application object controlled in coordinates by the coordinate controlling element.

3 Claims, 17 Drawing Sheets

USER G'S BROWSER SCREEN

U.S. PATENT DOCUMENTS

| | | |
|---|---|---|
| 6,510,417 B1 * | 1/2003 | Woods et al. ............... 704/275 |
| 6,981,220 B2 * | 12/2005 | Matsuda .................... 715/706 |
| 2002/0120925 A1 * | 8/2002 | Logan .......................... 725/9 |
| 2004/0255330 A1 * | 12/2004 | Logan ....................... 725/115 |
| 2004/0268386 A1 * | 12/2004 | Logan et al. ................ 725/34 |
| 2005/0262043 A1 * | 11/2005 | Saito ............................ 707/1 |

OTHER PUBLICATIONS

Ken Uston, Mastering Pac-Man Plus and Super Pac-Man, Fall 1983, Creative 'computing Video & Arcade Game vol. 1, No. 2, pp. 1-9.*

* cited by examiner

FIG. 9

| AVATARS | ATTRIBUTES OF AVATARS | SANDWICH MAN "s" (NUMBER OF TIMES EACH AD IS VIEWED BY EACH AVATAR) | | |
|---|---|---|---|---|
| | CURRENT COORDINATES | ADVERTISEMENT $A_1$ | ADVERTISEMENT $A_2$ | ADVERTISEMENT $A_3$ |
| a | Xa Ya Za | 1 | 0 | 0 |
| b | Xb Yb Zb | 1 | 2 | 0 |
| c | Xc Yc Zc | 1 | 0 | 0 |
| d | Xd Yd Zd | 2 | 3 | 0 |
| e | Xe Ye Ze | 1 | 0 | 0 |
| f | Xf Yf Zf | 1 | 0 | 0 |
| g | Xg Yg Zg | 0 | 1 | 0 |
| h | Xh Yh Zh | 1 | 0 | 0 |
| i | Xi Yi Zi | 0 | 0 | 0 |

F I G. 12
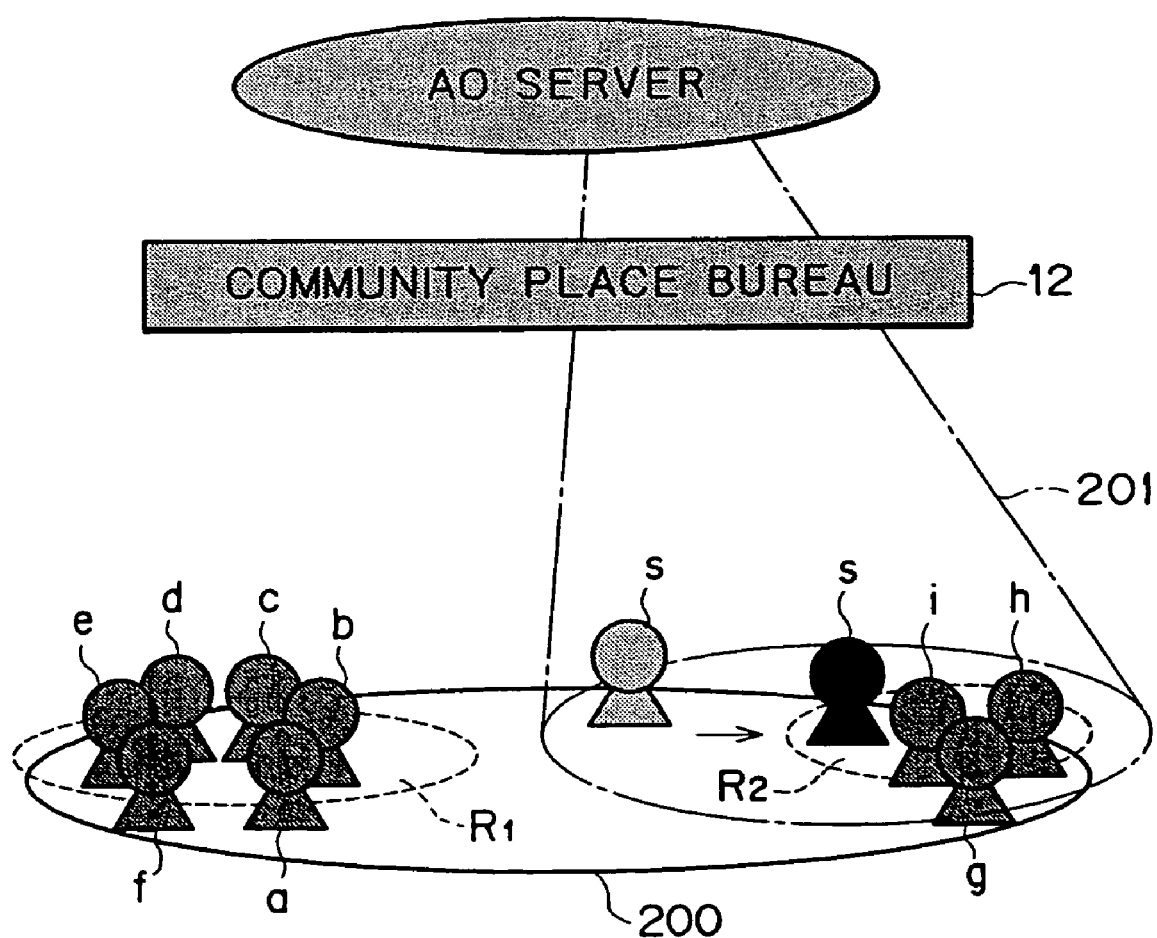

USER G'S BROWSER SCREEN

USER H'S BROWSER SCREEN

INFORMATION PROCESSING APPARATUS AND METHOD, AND STORAGE MEDIUM

BACKGROUND OF THE INVENTION

The present invention relates to an apparatus and a method for information processing and a storage medium for storing such a method. More particularly, the invention relates to an apparatus and a method for information processing and a storage medium for accommodating that method, whereby advertisement information is presented in an efficient and effective manner to avatars that are active in a shared virtual space.

There have existed personal computer network services such as NIFTY-Serve (trademark) of Japan and CompuServe (trademark) of the United States. Each of these entities allows a plurality of users to connect their personal computers through modems and over a public switched telephone network to a centrally located host computer in accordance with a predetermined communication protocol. A cyberspace service called Habitat(trademark) has been known in this field.

The development of Habitat was started in 1985 by Lucas-Film Ltd. of the United States. When completed, Habitat was run by QuantumLink, a U.S. commercial network, for about three years before Fujitsu Habitat(trademark) began to be offered in Japan by NIFTY-Serve in February 1990. Habitat embraces a virtual city called "Populopolis" which, drawn in two-dimensional graphics, is inhabited by users' alter egos called avatars (incarnations of Hindu deities). Through their avatars, the users carry on between them what is known as a chat (a real-time text-based dialogue in which characters are input and read by users). More detailed information about Habitat is found in "Cyberspace: First Steps" (ed. by Michael Benedikt, 1991, MIT Press, Cambridge, Mass., ISBN0-262-02327-X, pp. 282-307).

In a conventional cyberspace system run by the above-mentioned type of personal computer network service, virtual streets as well as house interiors were described in two-dimensional graphics. For apparent movement toward the depth of a scene or back to its front side, avatars were simply moved upward or downward against a two-dimensional background. There was precious little power of expression to make users enjoy a virtual experience of walking or moving about in the virtual space. Furthermore, a given user's avatar was viewed along with other users' avatars simply from a third party's point of view in the virtual space. This was another factor detracting from the effort to let users have more impressive virtual sensory experiences.

In order to improve on such more or less unimpressive proxy experiences, there have been proposed functions which display a virtual space in three-dimensional graphics and which allow users freely to move about in the virtual space from their avatars' points of view. Such functions, disclosed illustratively in U.S. Pat. No. 5,956,038, are implemented by use of 3D graphic data in description language called VRML (Virtual Reality Modeling Language). A description of various cyberspace environments in which users may carry on chats using avatars is found in the Sep. 9, 1996 issue of Nikkei Electronics (a Japanese periodical; No. 670, pp. 151-159).

Where it is desired to present advertisement information to avatars that are active in the above-mentioned shared virtual space, it has been customary to set up billboards at predetermined locations within the space, the billboards carrying the advertisements.

One disadvantage of such a conventional setup is that some billboards may turn out to be located in places where few avatars congregate. In that case, the advertisements obviously are not effective.

Another disadvantage is that users, represented by their avatars, have difficulty taking in the advertisements unless they come close to the billboards.

Furthermore, even if the billboards are erected where avatars concentrate, most of the avatars may already have seen the displayed advertisements. In that case, it becomes difficult to present the advertisement information to newly-arriving avatars that have not seen it yet.

In addition, because the advertisements remain the same in content when presented to all avatars, it is difficult to present new advertisement information efficiently to each avatar.

The present invention has been made in view of the above circumstances and provides an apparatus and a method for presenting advertisement information to avatars in an efficient and effective manner.

SUMMARY OF THE INVENTION

In carrying out the invention and according to a first aspect thereof, there is provided an information processing apparatus for controlling an application object moving autonomously in a shared virtual space in which avatars representing users of other information processing apparatuses are active, the information processing apparatus comprising a distribution examining element for examining distribution of the active avatars in the shared virtual space, a coordinate controlling element for controlling coordinates of the application object in accordance with results of the examination by the distribution examining element and a display controlling element for controlling display of information by the application object controlled in coordinates by the coordinate controlling element.

In one preferred structure of the information processing apparatus according to the first aspect of the invention, the display controlling element may cause the application object to display advertisements.

According to a second aspect of the invention, there is provided an information processing method for use with an information processing apparatus for controlling an application object moving autonomously in a shared virtual space in which avatars representing users of other information processing apparatuses are active, the information processing method comprising the steps of examining distribution of the active avatars in the shared virtual space, controlling coordinates of the application object in accordance with results of the examination in the distribution examining step and controlling display of information by the application object controlled in coordinates in the coordinate controlling step.

According to a third aspect of the invention, there is provided a program storage medium which stores a computer-readable program for use by an information processing apparatus for controlling an application object moving autonomously in a shared virtual space in which avatars representing users of other information processing apparatuses are active, the program comprising the steps of examining distribution of the active avatars in the shared virtual space, controlling coordinates of the application object in accordance with results of the examination in the distribution examining step and controlling display of information by the application object controlled in coordinates in the coordinate controlling step.

The information processing apparatus according to the first aspect of the invention, the information processing method according to the second aspect of the invention, and the program storage medium according to the third aspect of the invention can permit controlling in coordinates of the application object that displays information in accordance with the distribution of the avatars involved. This makes it possible to present desired information to the users represented by the avatars in an efficient and effective manner.

According a fourth aspect of the invention, there is provided an information processing apparatus for controlling an application object moving autonomously in a shared virtual space in which avatars representing users of other information processing apparatuses are active, the information processing apparatus comprising an attribute examining element for examining attributes of the active avatars in the shared virtual space and a display controlling element for controlling display of information by the application object in accordance with results of the examination by the attribute examining element.

One preferred structure of the information processing apparatus according to the fourth aspect of the invention may further comprise a coordinate controlling element for controlling coordinates of the application object in accordance with results of the examination by the attribute examining element.

In another preferred structure of the information processing apparatus according to the fourth aspect of the invention, the display controlling element may cause the application object to display advertisements.

According to a fifth aspect of the invention, there is provided an information processing method for use with an information processing apparatus for controlling an application object moving autonomously in a shared virtual space in which avatars representing users of other information processing apparatuses are active, the information processing method comprising the steps of examining attributes of the active avatars in the shared virtual space and controlling display of information by the application object in accordance with results of the examination in the attribute examining step.

According to a sixth aspect of the invention, there is provided a program storage medium which stores a computer-readable program for use by an information processing apparatus for controlling an application object moving autonomously in a shared virtual space in which avatars representing users of other information processing apparatuses are active, the program comprising the steps of examining attributes of the active avatars in the shared virtual space and controlling display of information by the application object in accordance with results of the examination in the attribute examining step.

The information processing apparatus according to the fourth aspect of the invention, the information processing method according to the fifth aspect of the invention and the program storage medium according to the sixth aspect of the invention can permit controlling of the information displayed by the application object in accordance with the attributes of the avatars. This enables ever-new information to be presented to the users symbolized by the avatars in an efficient and effective manner.

According to a seventh aspect of the invention, there is provided an information processing apparatus for controlling an application object moving autonomously in a shared virtual space in which avatars representing users of other information processing apparatuses are active, the information processing apparatus comprising an examining element for examining at least either distribution or attributes of the active avatars in the shared virtual space, a coordinate controlling element for controlling coordinates of the application object in accordance with results of the examination by the examining element, a display controlling element for controlling display of information by the application object, a counting element for counting the number of avatars positioned within a predetermined range around the application object and a charging element for processing charges for the information controlled in terms of display by the display controlling element in accordance with results of the counting by the counting element.

In one preferred structure of the information processing apparatus according to the seventh aspect of the invention, the counting element may weight the number of the avatars in keeping with the attributes thereof.

According to an eighth aspect of the invention, there is provided an information processing method for use with an information processing apparatus for controlling an application object moving autonomously in a shared virtual space in which avatars representing users of other information processing apparatuses are active, the information processing method comprising the steps of examining at least either distribution or attributes of the active avatars in the shared virtual space, controlling coordinates of the application object in accordance with results of the examination in the examining step, controlling display of information by the application object, counting the number of avatars positioned within a predetermined range around the application object and processing charges for the information controlled in terms of display in the display controlling step in accordance with results of the counting in the counting step.

According to a ninth aspect of the invention, there is provided a program storage medium which stores a computer-readable program for use by an information processing apparatus for controlling an application object moving autonomously in a shared virtual space in which avatars representing users of other information processing apparatuses are active, the program comprising the steps of examining at least either distribution or attributes of the active avatars in the shared virtual space, controlling coordinates of the application object in accordance with results of the examination in the examining step, controlling display of information by the application object, counting the number of avatars positioned within a predetermined range around the application object and processing charges for the information controlled in terms of display in the display controlling step in accordance with results of the counting in the counting step.

The information processing apparatus according to the seventh aspect of the invention, the information processing method according to the eight aspect of the invention, and the program storage medium according to the ninth aspect of the invention can permit counting of the number of the avatars located within a predetermined range around the application object and; based on the results of the counting, process charges for the information displayed by the application object. This provides easy and reliable processing of the charges appropriate to the effects of the information presented to the users.

Other objects, features and advantages of the invention will become more apparent upon a reading of the following description and appended drawings.

BRIEF DESCRIPTION OF THE DRAWINGS

FIG. 9 is a tabular view of typical sandwich man data held by the AO server of FIG. 3;

FIG. 12 is another schematic view explaining how a sandwich man moves in the virtual world;

DESCRIPTION OF THE PREFERRED EMBODIMENTS

Figure 1:
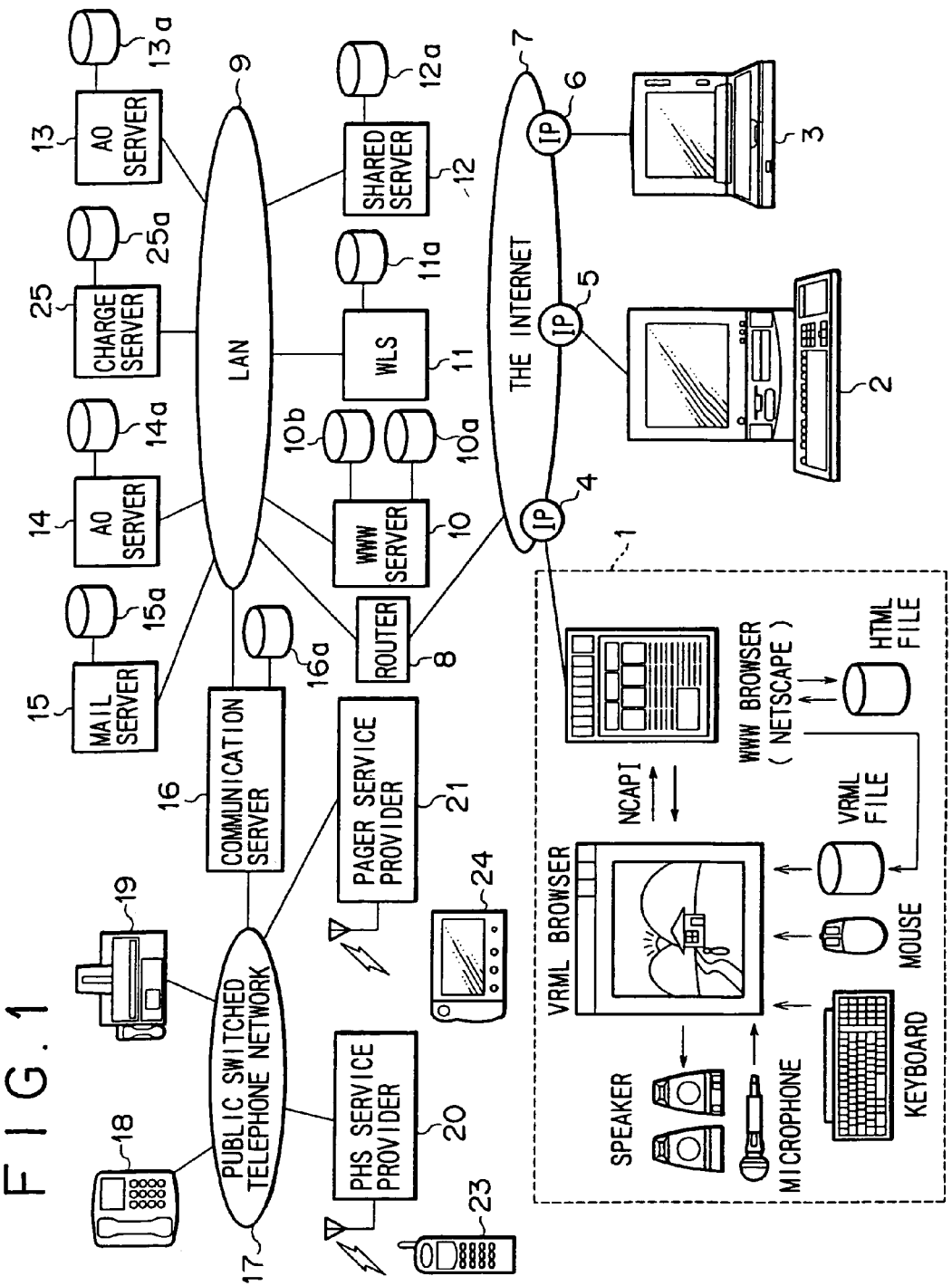
FIG. 1 is a block diagram showing a configuration of a shared virtual space offering system according to the present invention.

Preferred embodiments of the present invention will be described below with reference to the accompanying drawings.

For the moment, the description of the embodiments is preceded by an explanation hereunder of VRML (virtual reality modeling language), a description language capable of handling three-dimensional information in unified fashion through the use of a framework called WWW (World Wide Web) that offers diverse kinds of information over the Internet, a globally established computer network.

The WWW, an information offering system utilized on the Internet, was developed by CERN (European Center for Nuclear Research) in Switzerland. The system permits browsing over the network of information made up of text, images and sounds in what is known as hypertext format. Information held in WWW servers is transferred asynchronously to terminals such as personal computers in accordance with a protocol called HTTP (Hyper Text Transfer Protocol).

The WWW server is constituted by server software called an HTTP demon and by HTML files that store hypertext information. The demon signifies programs that perform management and processing in the background in a UNIX work environment. Hypertext information is expressed in description language called HTML (HyperText Markup Language). A hypertext description expresses a logical text structure enclosed by format codes "<" and ">" called tags. Description of links to other information is provided by link information called anchors. Locations of information are designated by anchors using URL (Uniform Resource Locator).

Files described in HTML are transferred over a TCP/IP (Transmission Control Protocol/Internet Protocol) network in accordance with the HTTP protocol. HTTP transfers requests from clients for information to WWW servers and sends hypertext information in HTML files back to the clients.

An environment in which to utilize the WWW is provided by client software called WWW browsers such as Netscape Navigator (trademark of Netscape Communications Corporation of the United States).

WWW browsers allow users to look up so-called websites, i.e., URL-compatible files in WWW servers located over the Internet expanded throughout the world. In what is known as net-surfing, users can hop from one website to another through links to access multitudes of WWW information sources.

Recently a new type of browsers called VRML browsers has been developed. A VRML browser permits users to access WWW servers one after another through links established in hypertext regarding objects drawn in an extended WWW format, i.e., three-dimensional graphics in a 3D space described in 3D graphics description language called VRML.

Details of VRML are described illustratively in "VRML: Browsing & Building Cyberspace" (by Mark Pesce; 1995, New Readers Publishing, ISBN 1-56205-498-8) and in "Latest Trends of VRML and CyberPassage" (articles by Koichi Matsuda and Yasuaki Honda in a Japanese periodical "bit" published by Kyoritsu Shuppan Co., Ltd., 1996; Vol. 28, No. 7, pp. 29-36; No. 8, pp. 57-65; No, 9, pp. 29-36; No. 10, pp. 49-58).

When a file described in VRML-compatible file format is transferred from a server to a user's personal computer and processed by browser, a three-dimensional virtual space is computed on the basis of VRML data. The 3D virtual space thus computed is allowed to appear on a display of the user's personal computer.

FIG. 1 is a block diagram showing an overall configuration of a shared virtual space offering system embodying the present invention.

In FIG. 1, reference numerals 1, 2 and 3 denote client PCs (personal computers) in which a VRML browser and a WWW browser are installed and active. The PCs are connected to the Internet via IP (Internet service providers) 4, 5 and 6.

A LAN (Local Area Network) 9 hooked up to the Internet 7 through a router 8 is connected with a WWW server 10, a WLS (World Location Server) 11, a shared server 12, AO (Application Object) servers 13 and 14, a mail server 15, a communication server 16, and a charge server 25. These servers 10 through 16 and 25 are furnished with hard disk drives (HDD) 10a, 10b, 11a through 16a and 25a, respectively.

The communication server 16 is connected to telephone sets 18 and facsimile machines 19 via a public switched telephone network 17; to PHS (Personal Handyphone System) terminals 23 wirelessly via a PHS service provider 20; and to pager terminals 24 wirelessly via a pager service provider 21.

Figure 2:
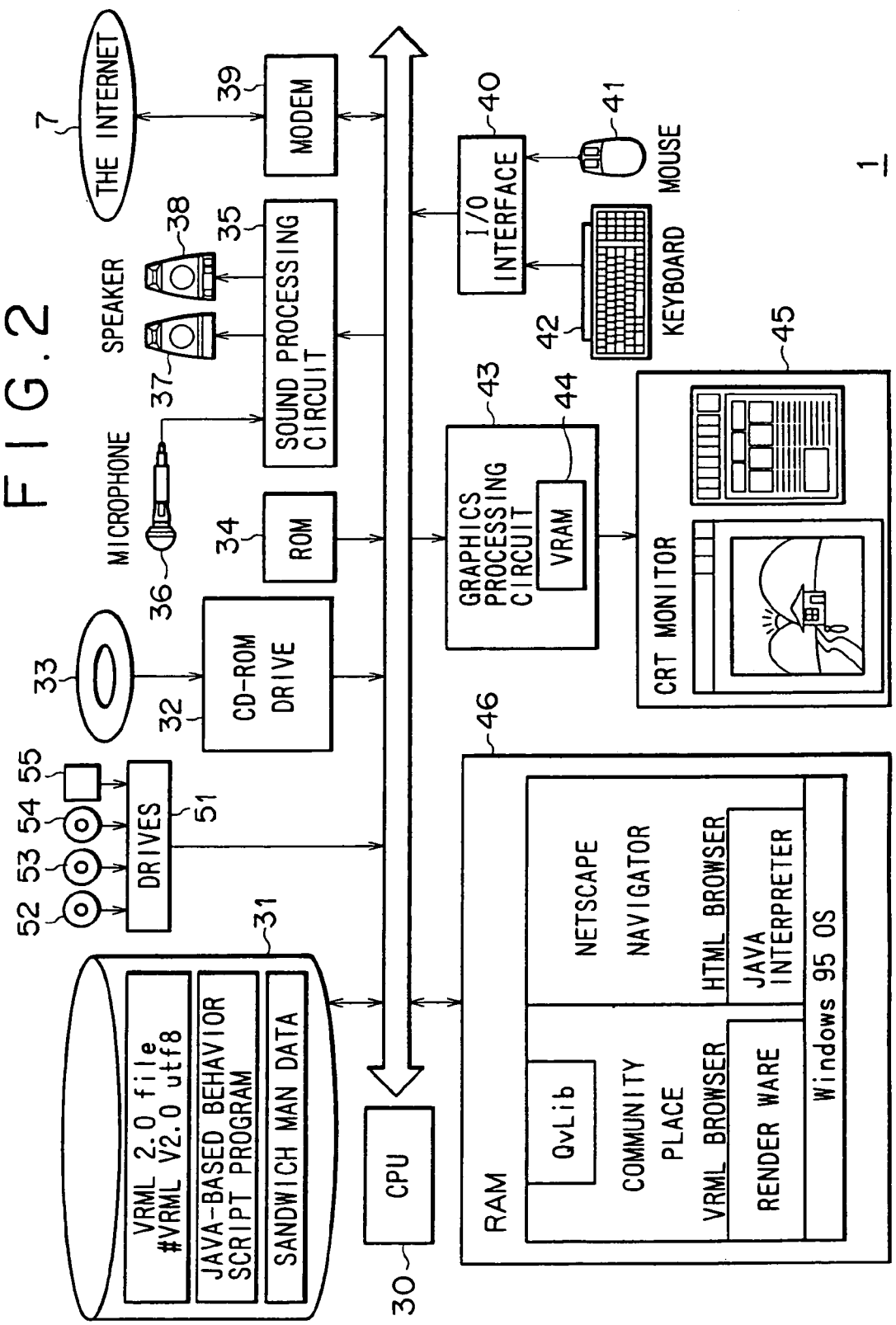
FIG. 2 is a block diagram showing a structure of a client PC in FIG. 1.

FIG. 2 is a block diagram illustrating a hardware structure of the client PC 1 shown in FIG. 1.

In FIG. 2, reference numeral 30 stands for a CPU that controls various components; 31 for a hard disk drive (HDD) that stores a VRML 2.0 file, VRML contents made up of dance script programs and a shared virtual life growth script program based on Java (trademark of Sun Microsystems, Inc. of the United States), and sandwich man data; 32 for a CD-ROM drive for reading the VRML contents from a CD-ROM disk 33; 34 for a ROM that stores BIOS (Basic Input Output Systems) and other resources; 35 for a sound processing circuit connected to a microphone 36 and a left-hand and a right-hand speaker 37 and 38; 39 for a modem connected to the Internet 7; 40 for an I/O (input/output) interface connected to a mouse 41 and a keyboard 42; 43 for a graphics processing circuit incorporating a VRAM 44; 45 for a CRT monitor; and 46 for a RAM.

In operation, Netscape Navigator, a WWW browser operating on Windows 95 (trademark of Microsoft Corporation of the United States); a Java interpreter; and Community Place Browser, a VRML 2.0 browser developed by Sony Corporation, are read into the RAM 46. Once placed in the RAM 46, these programs are ready to be run by the CPU 30.

The VRML 2.0 browser incorporates QvLib, i.e., a VRML parsing library (parser) developed by Silicon Graphics Inc. of the United States and offered free of charge; RenderWare, a software renderer provided by Criterion Software Ltd. of the United Kingdom; or a parser and a renderer having functions equivalent to those of the cited.

As shown in FIG. 1, Community Place Browser exchanges various data with Netscape Navigator acting as a WWW browser on the basis of NCAPI (Netscape Client Application Programming Interface; a trademark).

Netscape Navigator is fed with an HTML file and VRML contents (including a VRML file and a Java-based script program) from the WWW server 10 over the Internet 7. The received file and contents are recorded onto the local HDD 31. Netscape Navigator processes the HTML file to display text and images on the CRT monitor. Community Place Browser, on the other hand, processes the VRML file to display a 3D virtual space on the CRT monitor and varies the behaviors of objects in the 3D virtual space in keeping with the results of processing of the script programs by the Java interpreter.

Although not shown, the other client PCs 2 and 3 have the same structure as the client PC 1.

Figure 3:
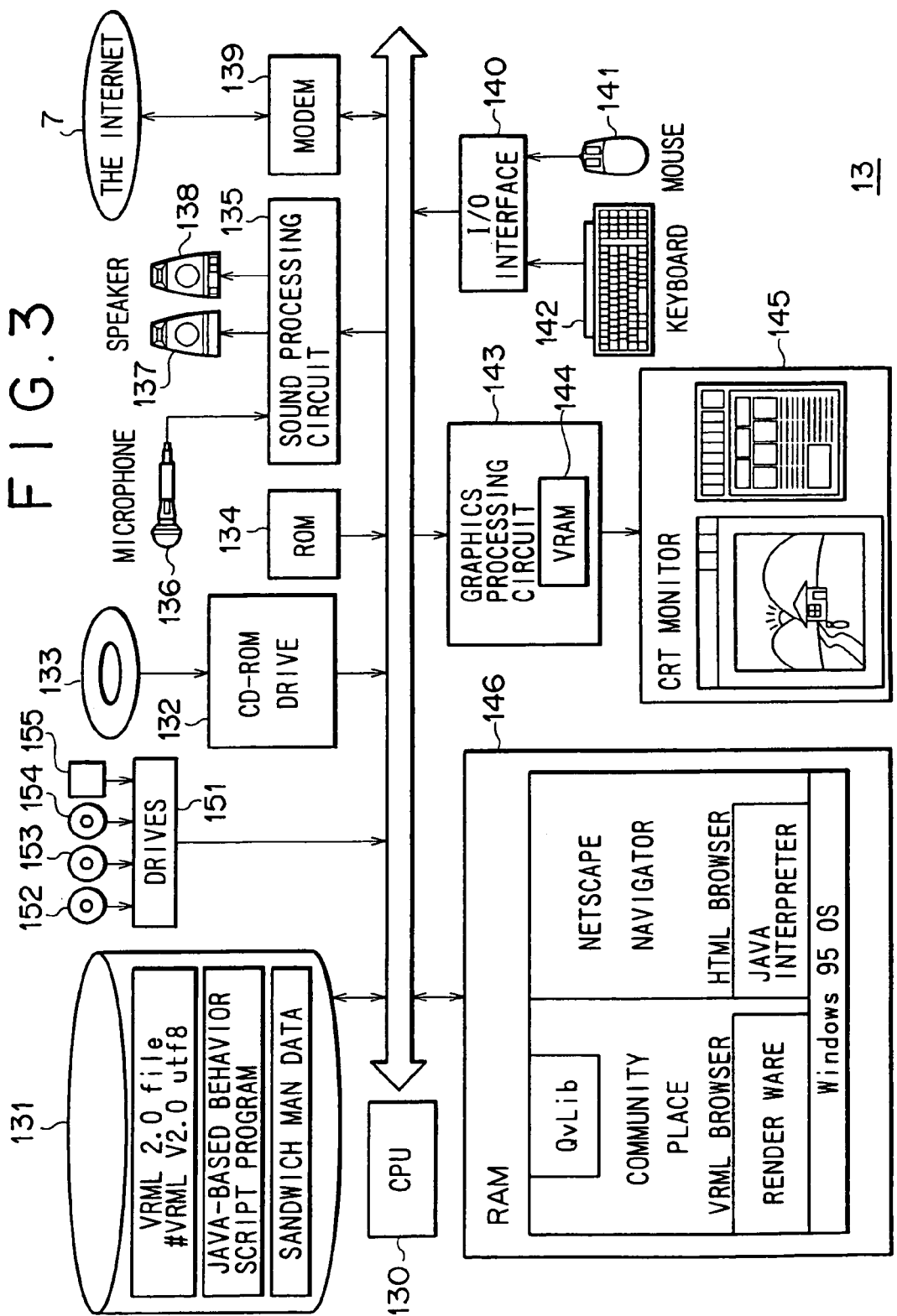
FIG. 3 is a block diagram of an AO server in FIG. 1.

FIG. 3 is a block diagram showing a typical structure of the AO server 13. The structure of the AO server 13 is basically the same as that of the client PC 1 in FIG. 2. The components in FIG. 2 ranging from the CPU 30 to the ROM 46 are reflected in FIG. 3 as a CPU 130 through a ROM 146 respectively. The basic functions of these components in FIG. 3 are the same as those of their counterparts in FIG. 2 and thus will not be described further.

Although not shown, the shared server 12 and charge server 25 are structurally the same as the AO server 13 in FIG. 3. The block diagram of FIG. 3 will thus be cited as needed in describing hereunder how the shared server 12 and charge server 25 are constituted.

Below is a description of how the above-described embodiment of the present invention works.

As an example, it is assumed here that VRML contents are downloaded over the Internet and turned into a multi-user environment where a single virtual space is shared by a plurality of users. Typical steps constituting the processing involved are described below with reference to FIGS. 4 through 6.

Figure 4:
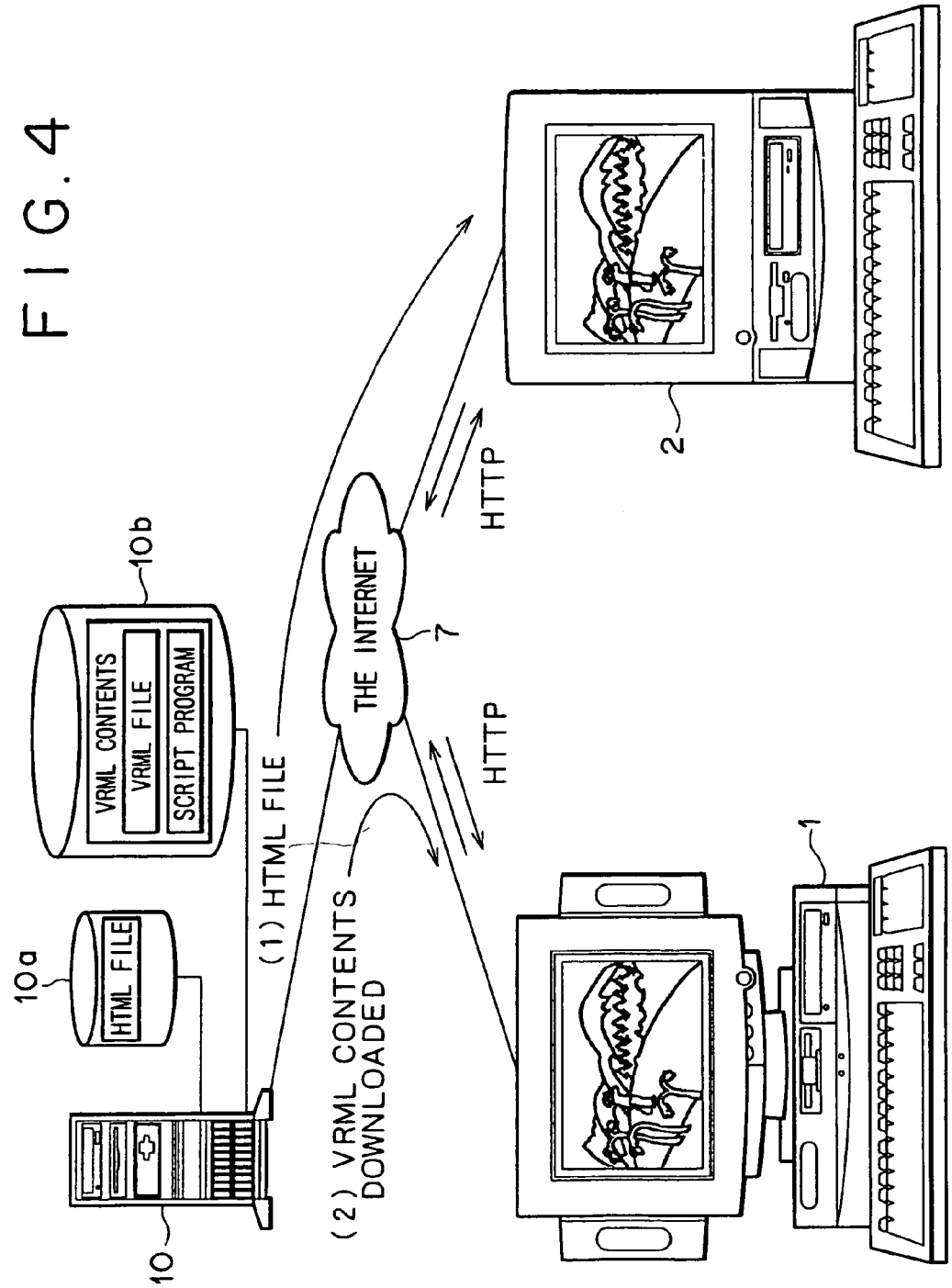
FIG. 4 is a schematic view showing a typical setup in which the system of FIG. 1 works.

In FIG. 4, as indicated by numeral (1), the WWW browser is first used to browse the home page of an website offering VRML contents. In this example, a website at http://pc.sony-.co.jp/sapari/ is looked up. As pointed to by numeral (2), users of the client PCs 1 and 2 each download from the website the VRML contents made up of the VRML 2.0 file and script program (Java-based growth script program) to implement autonomous avatar behavior in a VRML space.

Obviously, the VRML contents may be provided by means of a CD-ROM disk 33 and may be read therefrom through the CD-ROM drive 32.

Figure 5:
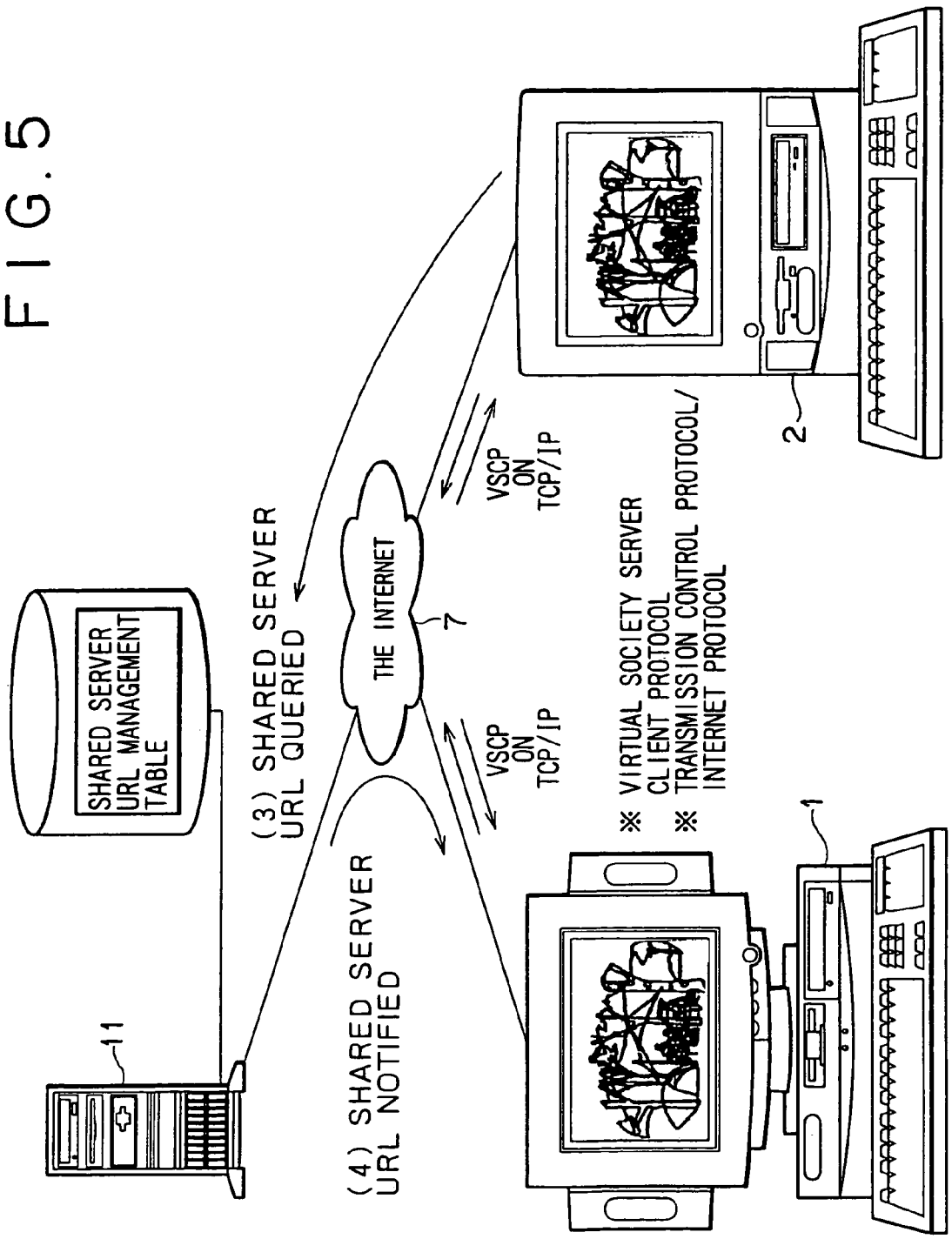
FIG. 5 is a schematic view depicting another typical setup in which the system of FIG. 1 works.

In each of the client PCs 1 and 2, as shown in FIG. 5, Community Place Browser acting as a VRML 2.0 browser interprets and executes the VRML 2.0 file that has been downloaded and stored onto the local HDD 31. As indicated by numeral (3), the browser queries the WLS 11 about a URL of the shared server 12 based on VSCP (Virtual Society Server Client Protocol). In response, as indicated by numeral (4), the WLS 11 refers to a shared server URL management table held on the HDD 11a and notifies the client PCs 1 and 2 of the URL of the shared server 12 retrieved from the table.

Figure 6:
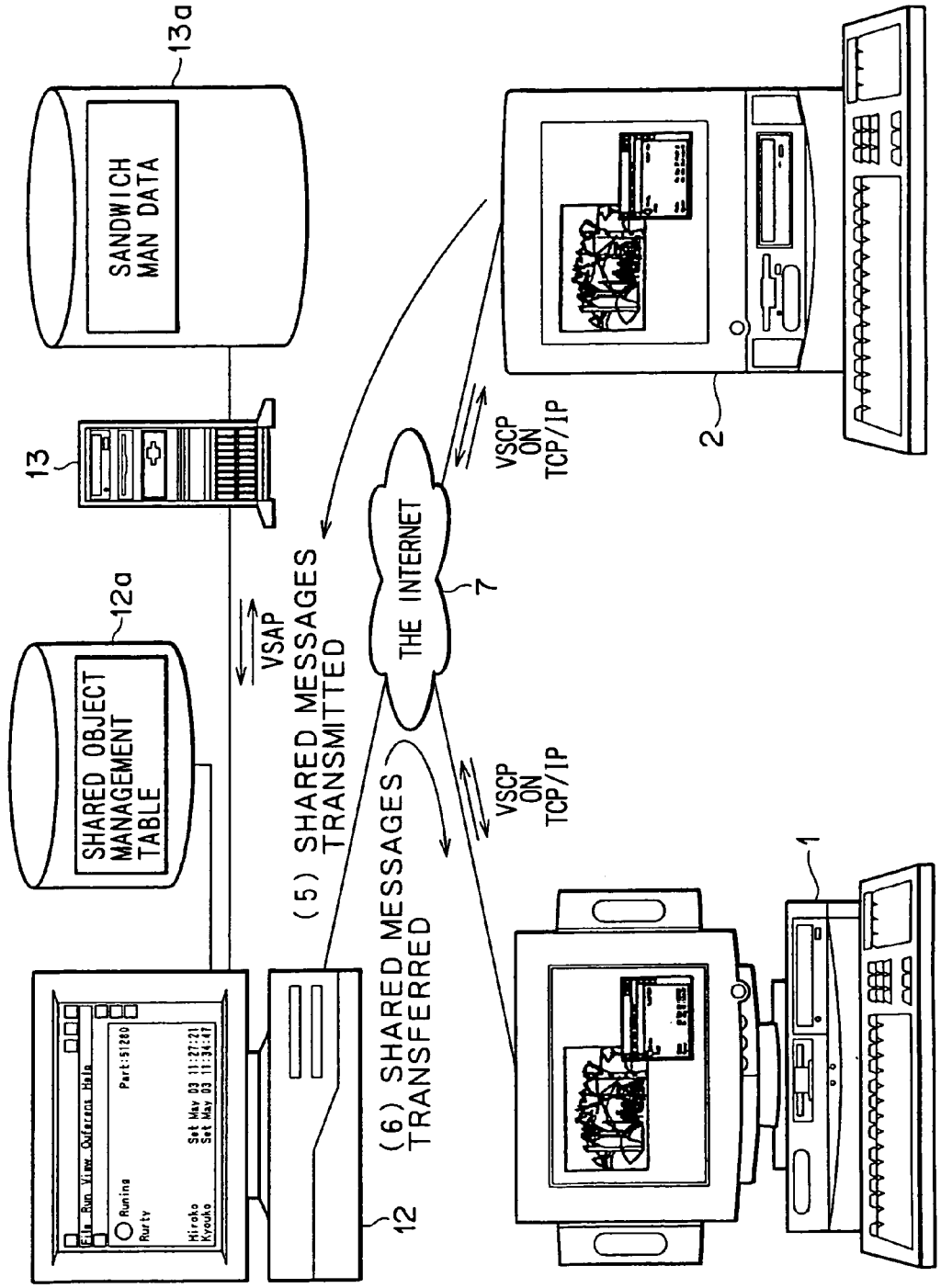
FIG. 6 is a schematic view indicating still another typical setup in which the system of FIG. 1 works.

Using the URL, the client PCs 1 and 2 link up to the shared server 12 as illustrated in FIG. 6. The linkup permits transmission of shared messages through the shared server 12 regarding locations and motions of shared 3D objects, as indicated by numeral (5). The transmission of the shared messages implements a multi-user environment, as pointed to by numeral (6).

More detailed steps for implementing the connection above are discussed in U.S. Pat. No. 5,956,038.

The AO server 13 that manages behaviors of virtual life objects in the shared virtual space exchange data about virtual life objects with the shared server 12 by use of VSAP. The HDD 13a contains data about specific virtual life objects (i.e., sandwich men in this case).

Figure 7:
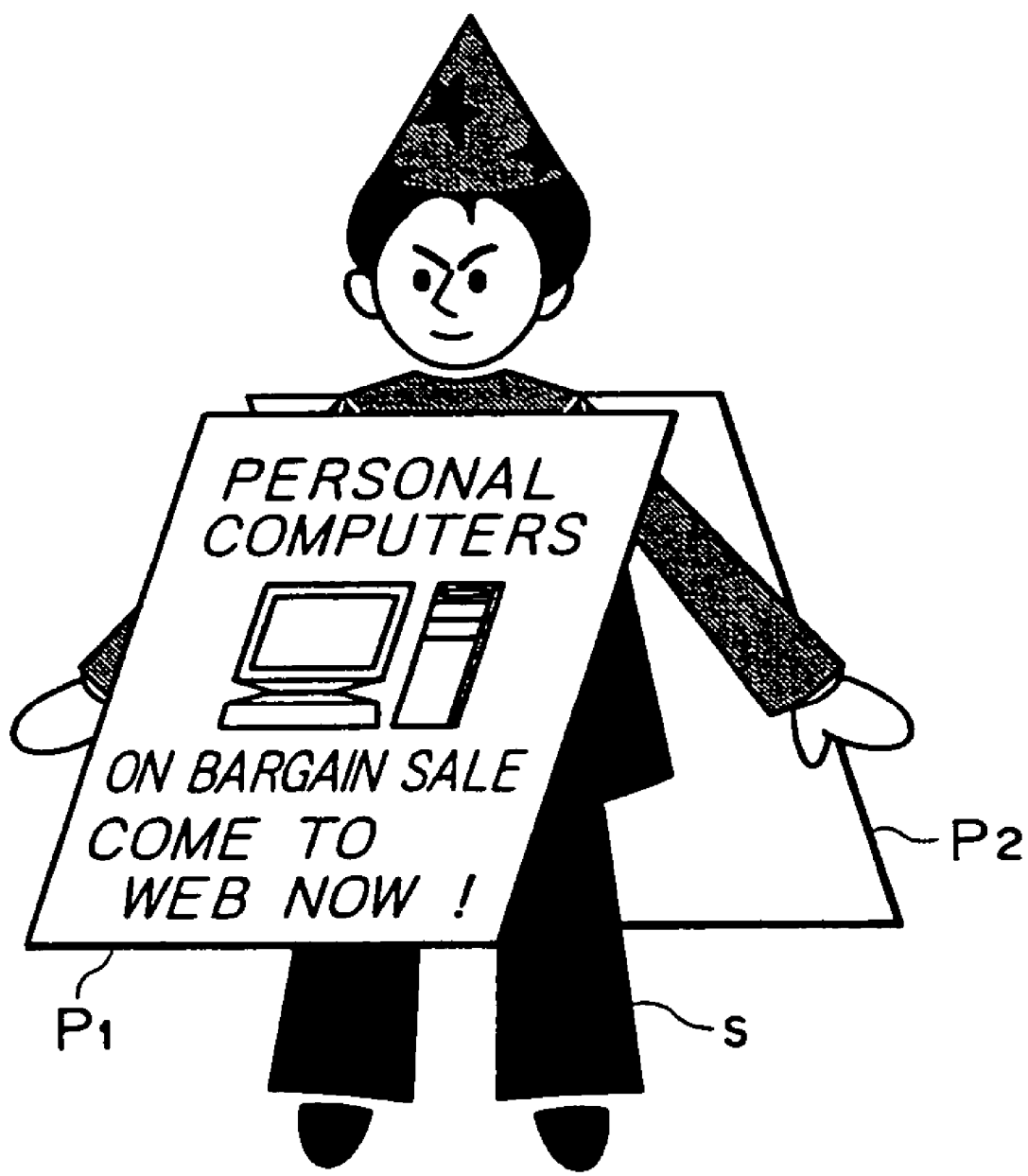
FIG. 7 is a schematic view of a typical sandwich man.

With this embodiment, a sandwich man "s" shown in FIG. 7 moves about autonomously as a virtual life object in the virtual space (world). The sandwich man "s" carries plates $P_1$ and $P_2$ in front of his chest and on his back, the plates showing predetermined advertisement information. The autonomous action of the sandwich man "s" is controlled by the AO server 13.

How the sandwich man "s" is controlled in its behavior through processing by the AO server 13 will now be described by referring to the flowchart of FIG. 8.

Figure 8:
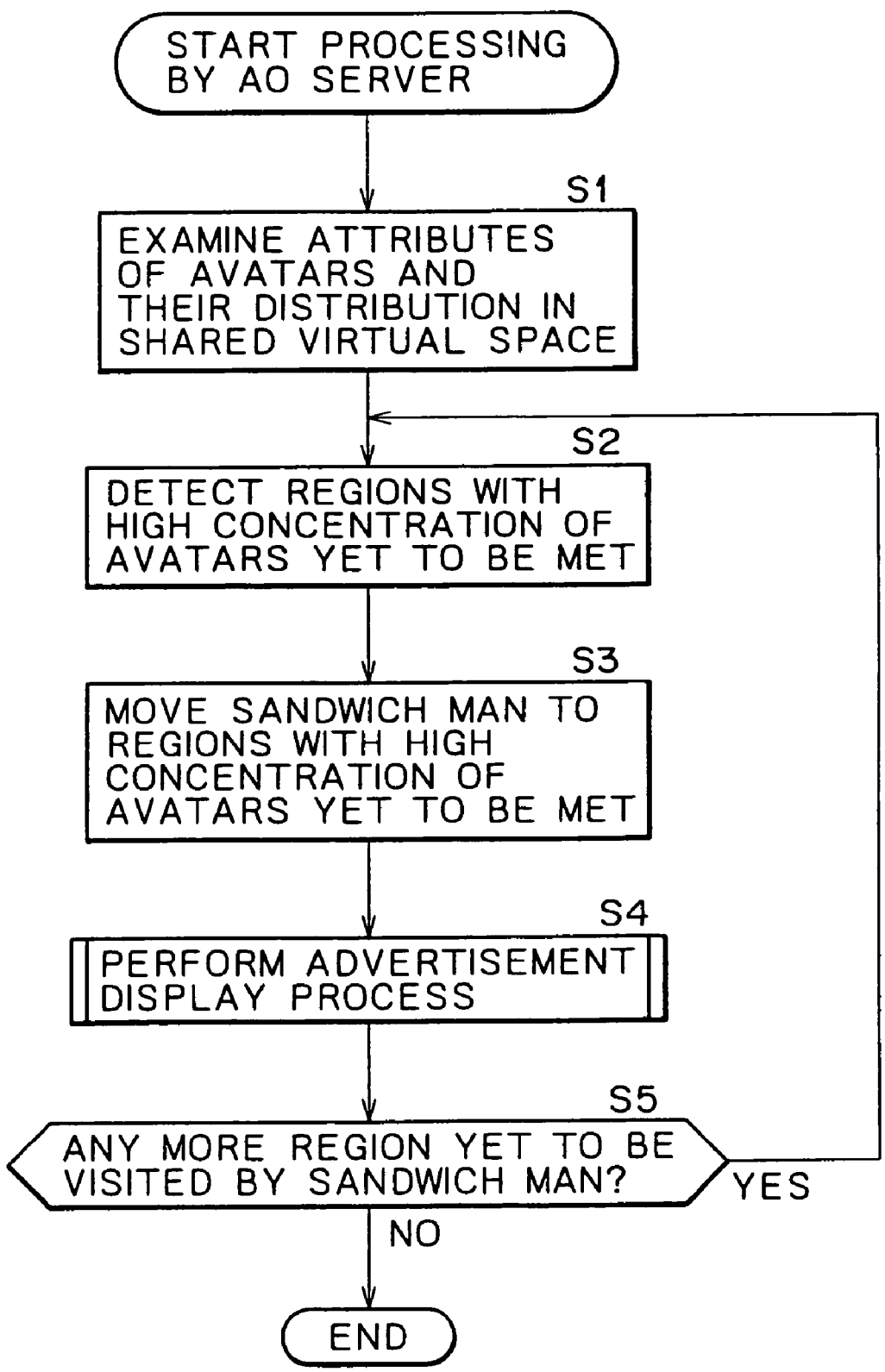
FIG. 8 is a flowchart of steps in which the AO server of the system in FIG. 1 operates.

In step S1 of FIG. 8, the CPU 130 of the AO server 13 examines attributes of avatars in the shared virtual space (world) and their distribution. More specifically, the CPU 130 of the AO server 13 acquires from the shared server 12 coordinates of each of the avatars in the virtual world and stores the obtained avatar coordinates on the hard disk drive 131.

FIG. 9 shows in tabular form typical sandwich man data stored on the hard disk drive 131. In this example, current coordinates (X, Y, Z) of avatars "a" through "i" in the virtual world are recorded. In FIG. 9, suffixes to the coordinates represent an avatar. For example, the coordinates of the avatar "a" in the virtual world are defined as $(Xa, Ya, Za)$; those of the avatar "b" are given as $(Xb, Yb, Zb)$.

The number of times each avatar has seen an advertisement is counted and stored (this is the number of times each avatar has met a sandwich man; more precisely, the number of times each avatar has entered an aura 201 (see FIG. 12) of the sandwich man "s"). The example of FIG. 9 shows illustratively that the avatar "a" has seen an advertisement $A_1$ once but has yet to see advertisements $A_2$ and $A_3$; the avatar "b" has seen the advertisement $A_1$ once and the advertisement $A_2$ twice but has not seen the advertisement $A_3$ yet.

As described, the CPU 130 can examine the distribution of the avatars by referring to their coordinates stored on the hard disk drive 131.

Figure 10:
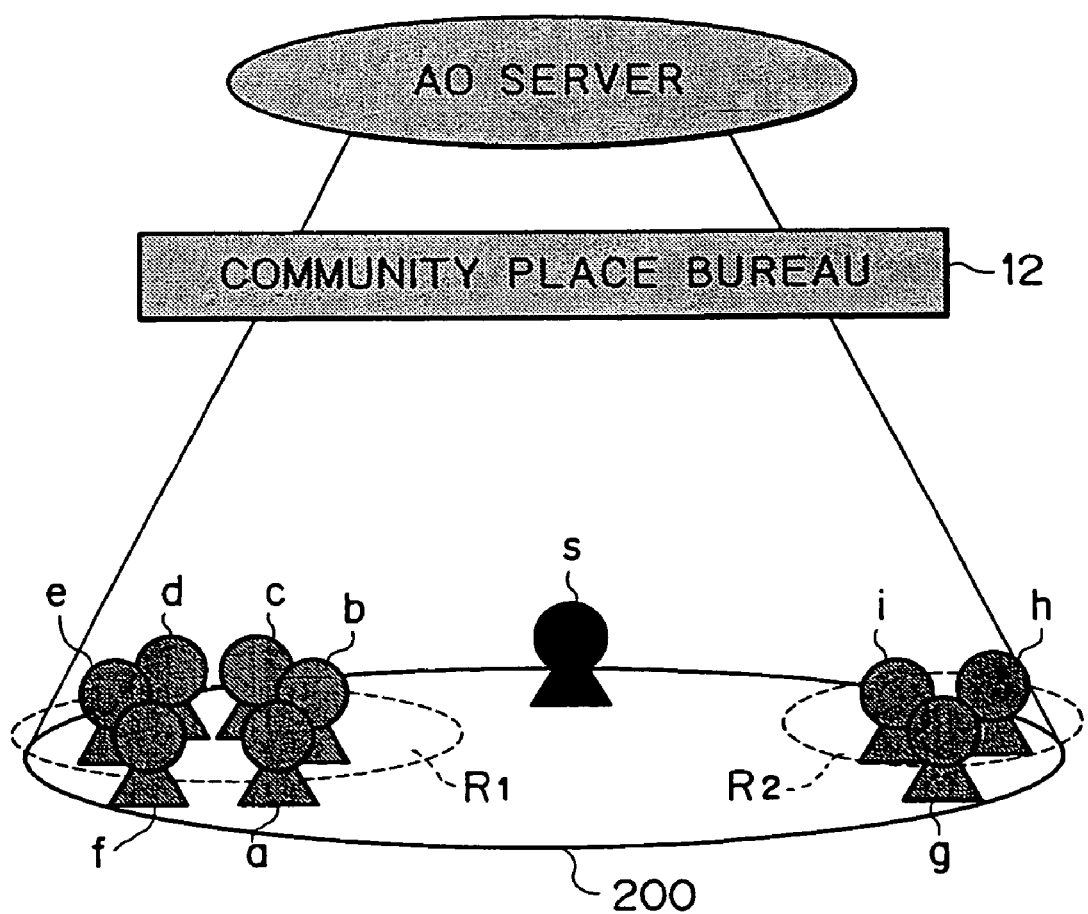
FIG. 10 is a schematic view explaining where avatars and sandwich man are located illustratively in a given virtual world.

Illustratively, as sketched in FIG. 10, examining the coordinates of the avatars in the virtual world 200 reveals that the avatars "a" through "f" are located in a region $R_1$ and the avatars "g" through "i" in a region $R_2$. A check on the attributes of the avatars in the regions $R_1$ and $R_2$ thus determines whether the sandwich man "s" has so far presented advertisements to each of these avatars.

In step S2 of FIG. 8, the CPU 130 detects regions with a high concentration of avatars that have yet to meet the sandwich man "s" (i.e., avatars yet to be presented with advertisements). In step S3, the CPU 130 performs of a process of moving the sandwich man "s" to the regions where the avatars yet to be encountered congregate (specifically, movement data (coordinate data) representing the sandwich man "s" are output to each client PC via the shared server 12).

Figure 11:
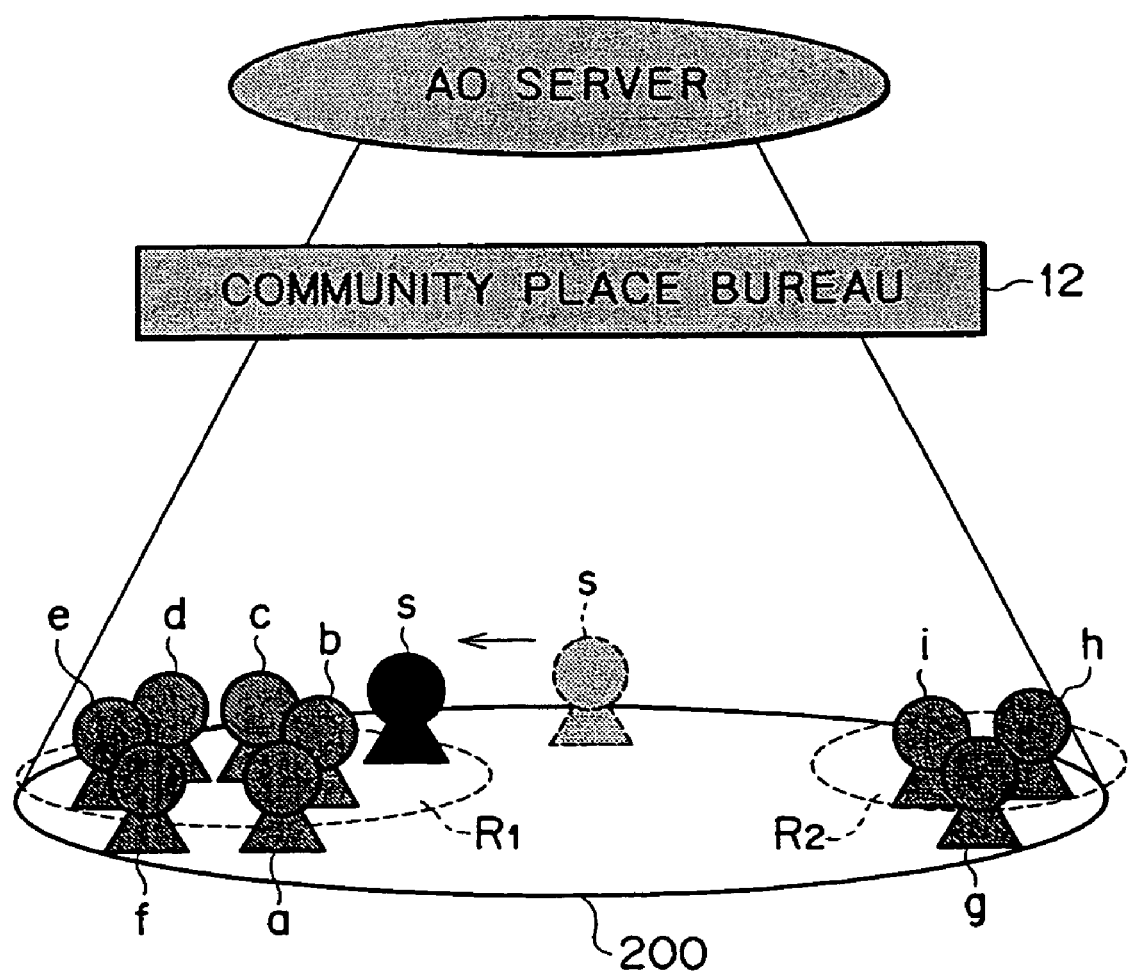
FIG. 11 is a schematic view explaining how a sandwich man moves in the virtual world.

Suppose that a sandwich man is to move simply toward a region with a higher concentration of avatars. In the situation of FIG. 10, the region $R_1$ has six avatars located therein while three avatars congregate in the region $R_2$. In that case, as shown in FIG. 11, the sandwich man "s" moves toward the region $R_1$ that has the higher avatar concentration than the region $R_2$.

However, as indicated in FIG. 9, the avatars "a" through "f" in the region $R_1$ have already seen the advertisement $A_1$, whereas the avatars "g" and "i" among the three avatars "g" through "i" in the region $R_2$ have yet to see the advertisement $A_1$. As a result, it is not the region $R_1$ but the region $R_2$ where the avatars yet to be met by the sandwich man (i.e., avatars yet to be presented with the advertisement $A_1$) are more concentrated. In that case, the sandwich man may as well move toward the region $R_2$ for better advertising effects.

The process of moving the sandwich man "s" is carried out by each client PC on the basis of the coordinate data supplied by the AO server 13.

In step S4, the CPU 130 of the AO server 13 performs an advertisement display process. Details of this process are shown in the flowchart of FIG. 13.

Figure 13:
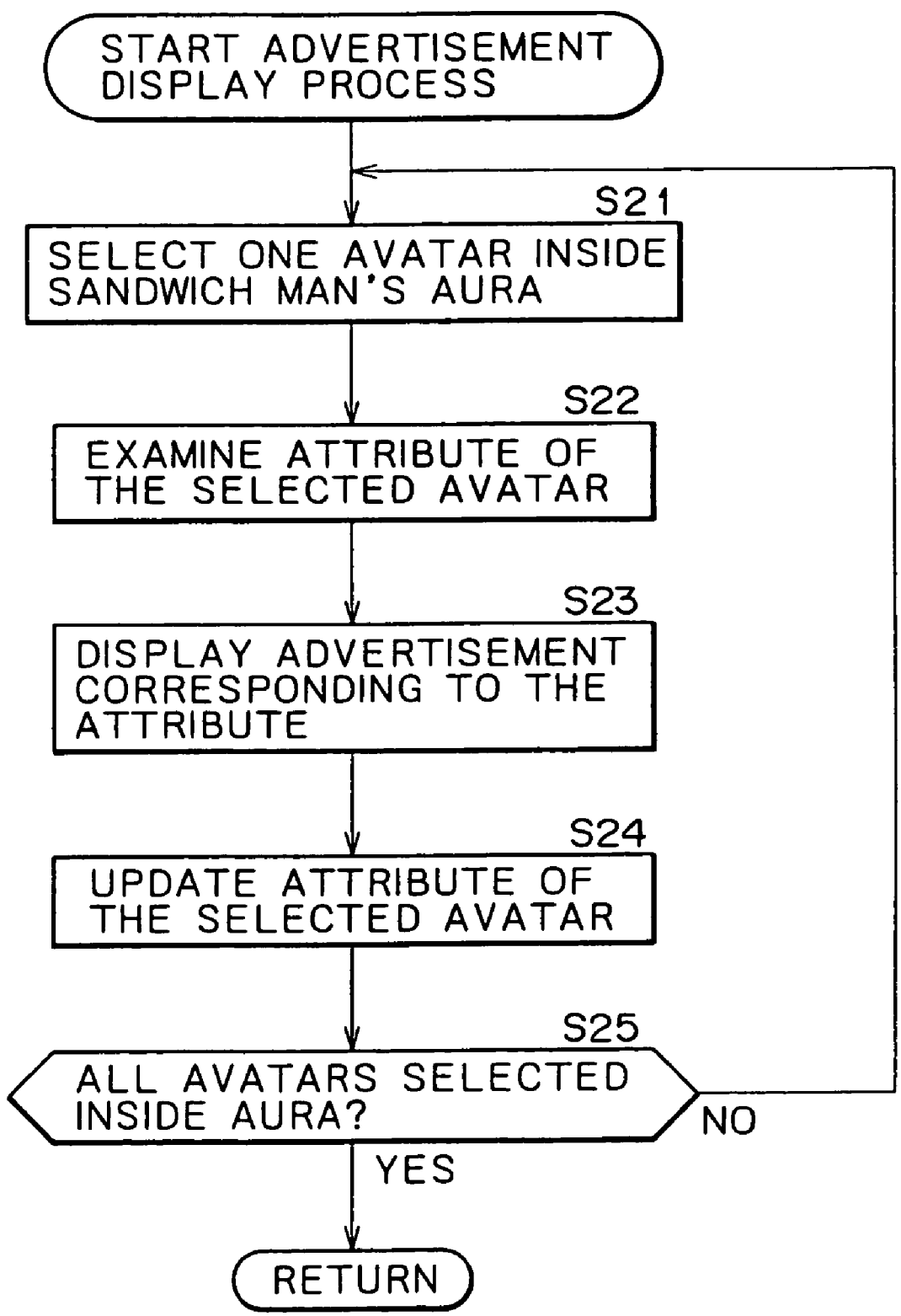
FIG. 13 is a flowchart of steps detailing an advertisement display process in step S4 of FIG. 8.

In step S21 of FIG. 13, the CPU 130 selects one of the avatars located within an aura 201 of the sandwich man "s." In the example of FIG. 12, the avatar "g" is selected illustratively from among the three avatars "g" through "i" in the region $R_2$.

In step S22, the CPU 130 examines the attribute of the avatar selected in step S21 (avatar "g" in this case). As indicated in FIG. 9, the avatar "g" has never seen the advertisement $A_1$ (i.e., has never met the sandwich man "s" carrying the advertisement $A_1$).

In step S23, the CPU 130 causes the plates $P_1$ and $P_2$ of the sandwich man "s" to display an advertisement appropriate to the attribute examined in step S22. In this example, the plates $P_1$ and $P_2$ indicate the advertisement $A_1$ for the avatar "g" to see. More specifically, data representing the advertisement $A_1$ are transferred from the AO server 13 to each client PC via the shared server 12. Given the data, the client PCs cause the plates $P_1$ and $P_2$ of the sandwich man "s" to display the advertisement $A_1$.

In step S24, the CPU 130 updates the attribute of the avatar selected in step S22. In this example, the attribute of the avatar "g" is modified to indicate that the avatar has seen the advertisement $A_1$ once.

In step S25, the CPU 130 checks to see if all avatars within the aura 201 have been selected. If there is any avatar yet to be selected, step S21 is reached again and subsequent steps are repeated.

Suppose now that the avatar "h" is selected in step S21. In that case, the CPU 130 examines the attribute of the avatar "h" in step S22. As indicated in FIG. 9, the avatar "h" has seen the advertisement $A_1$ once but has never seen the advertisement $A_2$. Then the CPU 130, reaching step S23, causes the plates $P_1$ and $P_2$ of the sandwich man "s" to display the advertisement $A_2$.

In step S24, the CPU 130 updates the attribute of the avatar "h" to indicate that the avatar has seen the advertisement $A_2$ once. In step S25, the CPU 130 checks to see if all avatars within the aura 201 have been selected. If there is any avatar yet to be selected, step S21 is reached again and subsequent steps are repeated. If in step S25 the CPU 130 has ascertained that all avatars within the aura 201 have been selected, the process is brought to an end.

Figure 14:
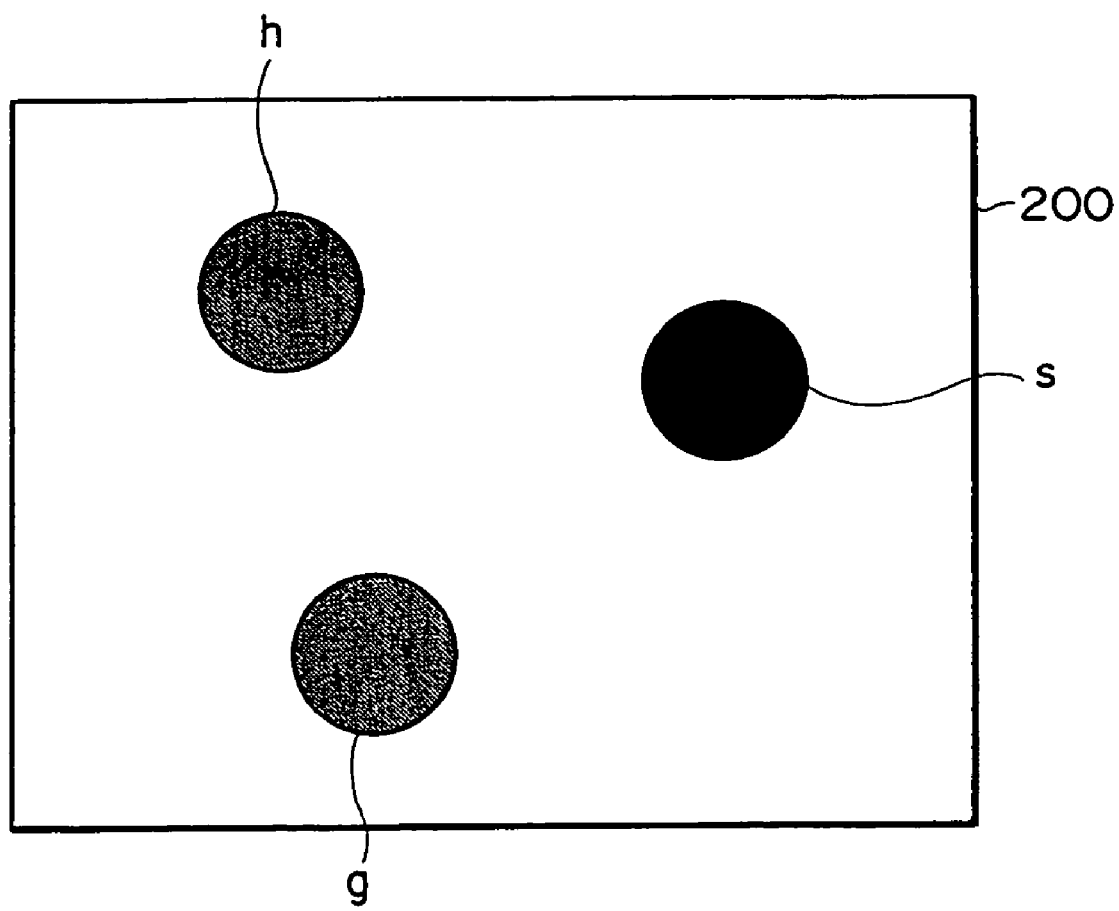
FIG. 14 is a schematic view explaining how a sandwich man is positioned relative to avatars.
Figure 15:
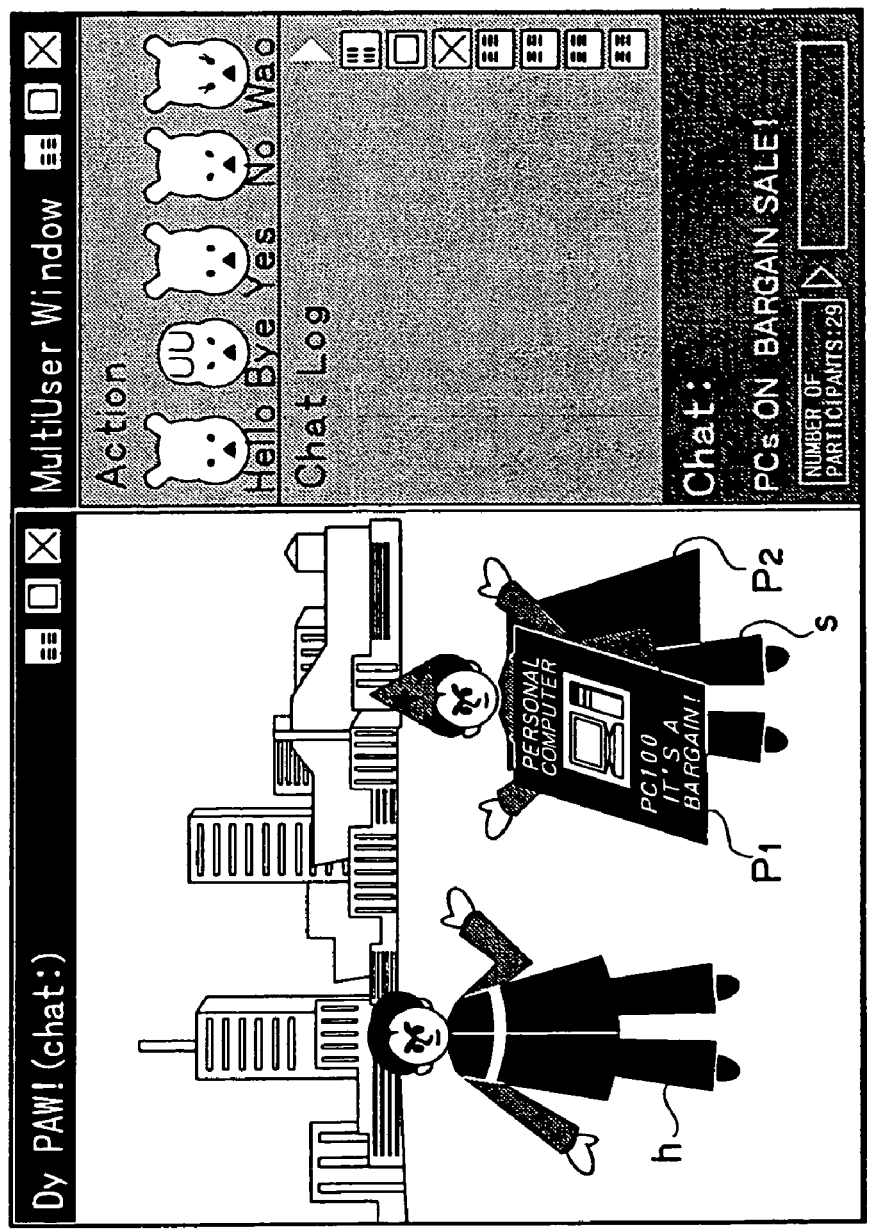
FIG. 15 is a schematic view of a typical screen displayed by a user's browser represented by an avatar in FIG. 14.

The process outlined above is further described below with reference to FIGS. 14 through 16. Illustratively, as shown in FIG. 14, suppose that the avatars "g" and "h" in the virtual world 200 are located inside the aura 201 of the sandwich man "s." In that case, the browser of the user G symbolized by the avatar "g" causes the plates $P_1$ and $P_2$ of the sandwich man "s" to display images of the advertisement $A_1$ as shown in FIG. 15.

Figure 16:
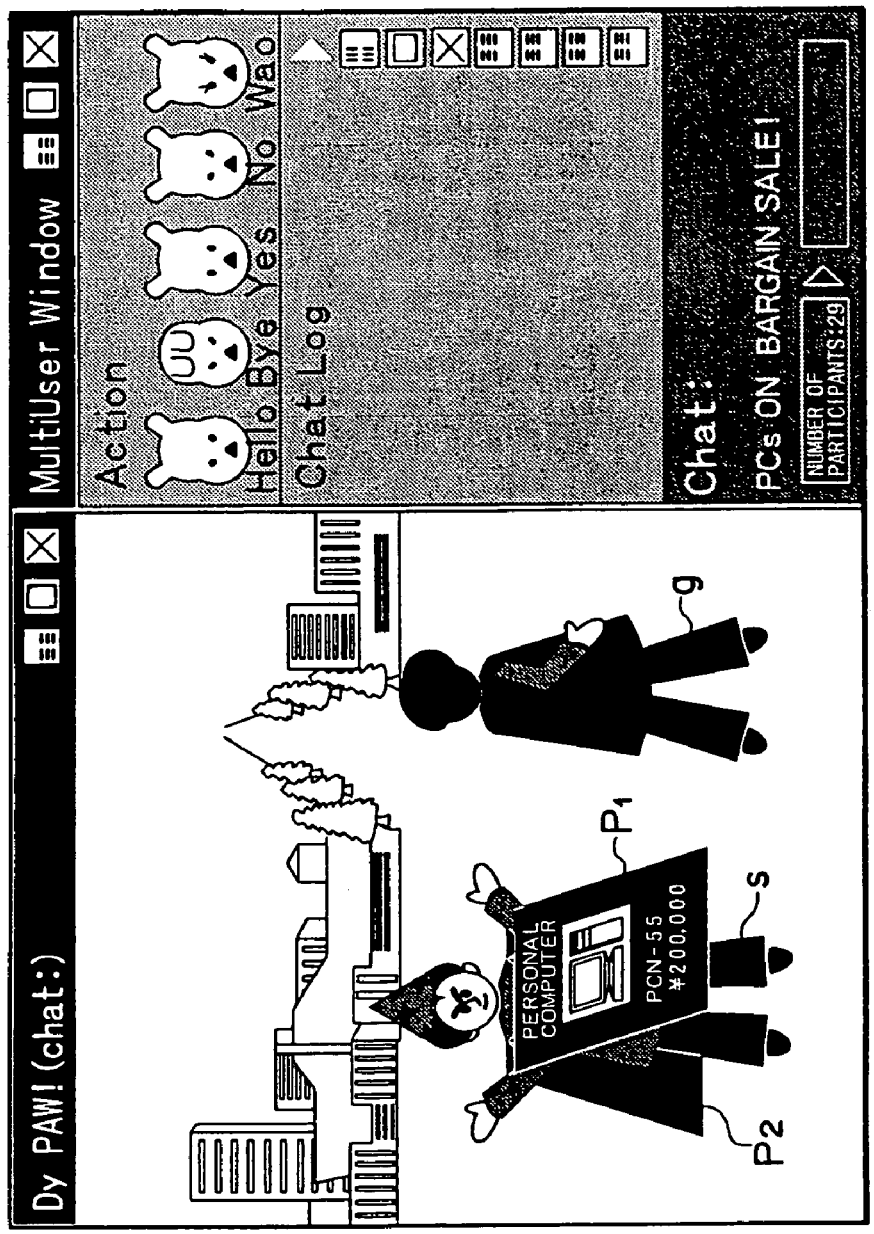
FIG. 16 is a schematic view of a typical screen displayed by a another user's browser symbolized by an another avatar in FIG. 14.

On the other hand, as depicted in FIG. 16, the browser of the user H represented by the avatar "h" causes the plates $P_1$ and $P_2$ of the sandwich man "s" to display images of the advertisement $A_2$.

That is, the advertisement carried by the plates $P_1$ and $P_2$ of the sandwich man "s" varies from one avatar to another (i.e., from one user to another). That never happens in the real world but is made possible in the virtual space. The scheme enables each user to be presented with new advertisement information more efficiently than before.

When the advertisement display process in step S4 of FIG. 8 is completed as described above, step S5 is reached. In step S5 of FIG. 8, the CPU 130 of the AO server 13 checks to see if there is any region in the virtual world 200 to which the sandwich man has never been before. If there is any such region, step S2 is reached again and subsequent steps are repeated. If in step S5 no region is judged to exist to which the sandwich man has yet to go, the process is terminated.

Where there are a plurality of sandwich men, the processes described above are carried out individually with regard to each of them.

As described, each sandwich man "s" moves around in the virtual world 200 carrying advertisement information on the plates $P_1$ and $P_2$. By coming close to avatars, the sandwich man presents various kinds of advertisement information to the users they represent.

The provider of the virtual world 200 processes charges for the presentation of advertisements in that world. The charge processing is carried out by the charge server 25 as outlined in FIG. 17.

Figure 17:
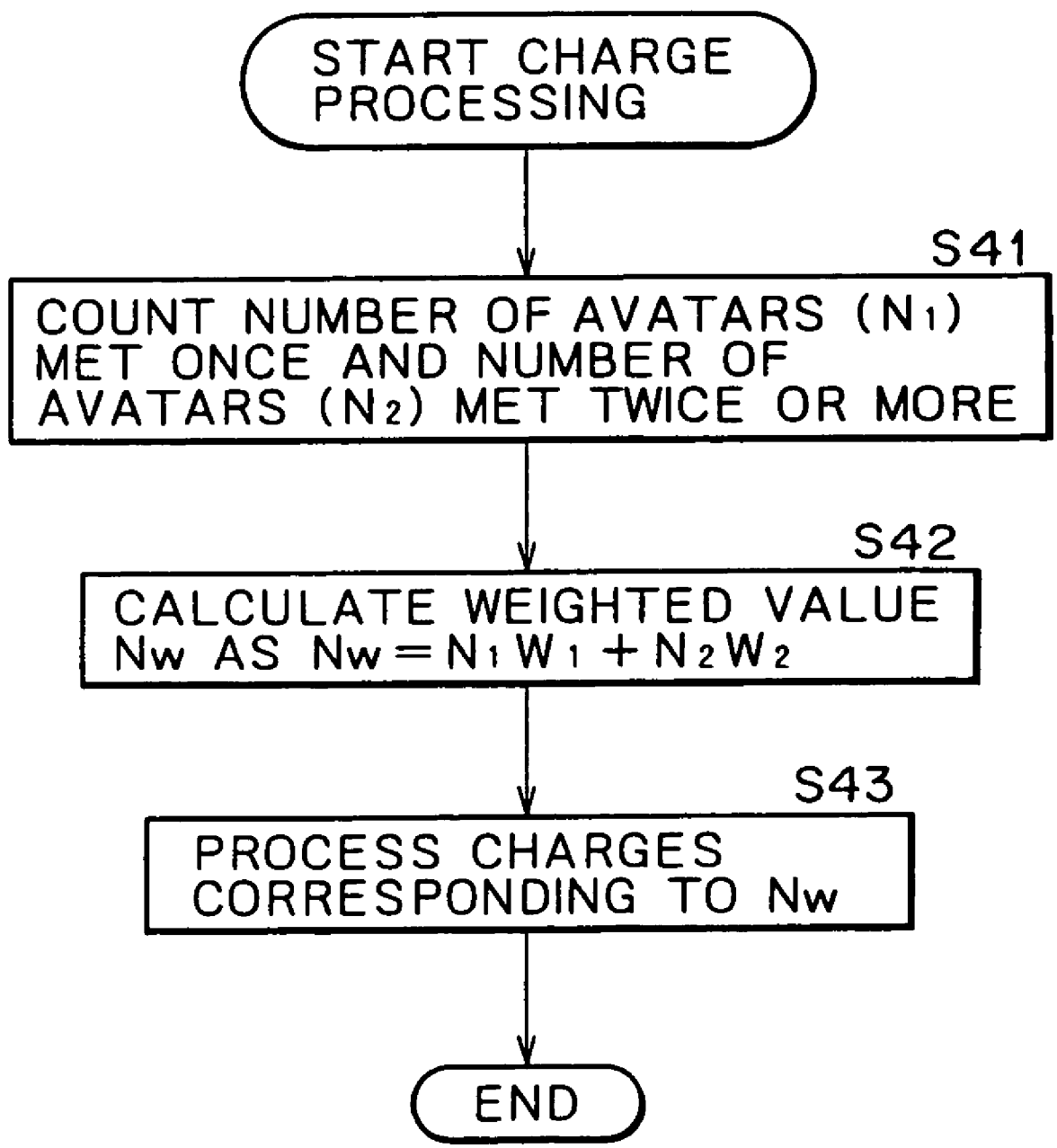
FIG. 17 is a flowchart of steps constituting a process performed by a charge server in FIG. 1.

In step S41 of FIG. 17, the CPU 130 of the charge server 25 counts the number of avatars ($N_1$) met once by the sandwich man "s" and the number of avatars ($N_2$) met twice or more by the same sandwich man. In the example of FIG. 9, the number of avatars ($N_1$) to which the sandwich man "s" has presented the advertisement $A_1$ once is six, while the number of avatars ($N_2$) to which the sandwich man has met twice or more carrying the same advertisement is one.

In step S42, the CPU 130 of the charge server 25 calculates a weighted value $N_W$ using the following formula:

$$N_W = N_1 W_1 + N_2 W_2$$

where, $W_1$ and $W_2$ are coefficients by which to weight the avatar counts $N_1$ and $N_2$ respectively. Illustratively, the coefficient $W_1$ may be 10 and the coefficient $W_2$ may be 1. In this case, the number of avatars to which an advertisement is presented for the first time is weighted ten times as much as the number of avatars to which the advertisement has been presented twice or more.

In step S43, the CPU 130 of the charge server 25 processes charges for the value $N_W$ calculated in step S42. Specifically, the administrator of the virtual world charges the sponsor of the advertisement $A_1$ a fee for the value $N_W$ based on the fact that the advertisement $A_1$ has been presented to the avatars of $N_W$ users.

The series of steps described above may be executed either by hardware or by software. For software-based processing to take place, programs constituting the software may be installed upon use from the Internet 7 or from a suitable storage medium into the client PCs 1, 2 and 3, shared server 12, AO server 13, and charge server 25.

As shown in FIG. 2 or 3, the storage medium is offered to users apart from computers not only as a package medium constituted by an optical disk 52 or 152 (including DVD (digital versatile disk) apart from the program-recorded CD-ROM 33 or 133), a magnetic disk 53 or 153 (including floppy disks), a magneto-optical disk 54 or 154 (including MD (Mini-disk)), or a semiconductor memory 55 or 155, any of them loaded into a drive 51 or 151; but also in the form of the ROM 34 or 134 or the hard disk drive 31 or 131 which contains the programs and which are incorporated beforehand in the client PC 1, shared server 12, AO server 13, and charge server 25.

In this specification, the steps which are preserved on a program storage medium and which describe the programs to be executed represent not only processes that are carried out in the depicted sequence (i.e., on a time series basis) but also those that are conducted parallelly or individually.

In this specification, the term "system" refers to an entire configuration made up of a plurality of component devices.

As many apparently different embodiments of this invention may be made without departing from the spirit and scope thereof, it is to be understood that the invention is not limited to the specific embodiments thereof except as defined in the appended claims.

What is claimed is:

1. An information processing apparatus for controlling an application object moving autonomously in a shared virtual space in which avatars representing users of other information processing apparatuses are active, said information processing apparatus comprising:

examining means for examining attributes of said active avatars in said shared virtual space, said attributes including a number of times each active avatar encountered the application object;

coordinate controlling means for controlling coordinates of said application object so as to be disposed in a region of said shared virtual space in which there is at least one or more active avatars that have not encountered the application object based on results of the examination by said examining means;

display controlling means for controlling display of information by said application object;

counting means for counting the number of avatars positioned within a predetermined range around said application object; and charging means for processing charges for the information controlled in terms of display by said display controlling means in accordance with results of the counting by said counting means.

2. An information processing method for use with an information processing apparatus for controlling an application object moving autonomously in a shared virtual space in which avatars representing users of other information processing apparatuses are active, said information processing method comprising the steps of:

examining, with a processor of the information processing apparatus, attributes of said active avatars in said shared virtual space, said attributes including a number of times each active avatar encountered the application object;

controlling, with processor of the information processing apparatus, coordinates of said application object so as to be disposed in a region of said shared virtual space in which there is at least one or more active avatars that have not encountered the application object based on results of the examination in said examining step;

controlling, with a display controller, display of information on a display device by said application object;

counting, with a processor of the information processing apparatus, the number of avatars positioned within a predetermined range around said application object; and processing charges, with a processor of the information processing apparatus, for the information controlled in terms of display in said display controlling step in accordance with results of the counting in said counting step.

3. A computer-readable storage medium encoded with instructions, which when executed by an information processing apparatus for controlling an application object moving autonomously in a shared virtual space in which avatars representing users of other information processing apparatuses are active, causes the information processing apparatus to implement a method comprising:

examining, with a processor of the information processing apparatus, attributes of said active avatars in said shared virtual space, said attributes including a number of times each active avatar encountered the application object;

controlling, with the processor of the information processing apparatus, coordinates of said application object so as to be disposed in a region of said shared virtual space in which there is at least one or more active avatars that have not encountered the application object based on results of the examination in said examining step;

controlling, with a display controller, display of information on a display device by said application object;

counting, with the processor of the information processing apparatus, the number of avatars positioned within a predetermined range around said application object; and processing charges, with the processor of the information processing apparatus, for the information controlled in terms of display in said display controlling step in accordance with results of the counting in said counting step.

\* \* \* \* \*